United States Patent
Nonogaki (10) Patent No.: US 6,625,478 B1
(45) Date of Patent: Sep. 23, 2003

(54) MULTIFUNCTION WIRELESS TELEPHONE

(75) Inventor: Masaru Nonogaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,521

(22) Filed: Mar. 1, 2000

(30) Foreign Application Priority Data

Mar. 1, 1999 (JP) ......................................... P11-053353

(51) Int. Cl.[7] .............................. H04B 1/38; H04M 1/00
(52) U.S. Cl. ........................ 455/574; 455/556; 455/343
(58) Field of Search .......................... 455/575, 90, 550, 455/571, 572, 573, 574, 343, 556, 557; 370/311; 327/544

(56) References Cited

U.S. PATENT DOCUMENTS

| | | | | |
|---|---|---|---|---|
| 5,381,460 A | * | 1/1995 | Ohashi et al. | 455/574 |
| 5,390,365 A | * | 2/1995 | Enoki et al. | 455/553 |
| 5,596,626 A | * | 1/1997 | Nakayama | 455/462 |
| 5,740,163 A | * | 4/1998 | Herve | 370/271 |
| 6,198,942 B1 | * | 3/2001 | Hayashi et al. | 455/552 |
| 6,198,947 B1 | * | 3/2001 | Barber | 455/563 |
| 6,278,887 B1 | * | 8/2001 | Son et al. | 455/566 |
| 6,349,220 B1 | * | 2/2002 | Prior et al. | 455/566 |
| 6,442,407 B1 | * | 8/2002 | Bauer et al. | 455/574 |
| 6,445,921 B1 | * | 9/2002 | Bell | 455/426 |
| 6,484,041 B1 | * | 11/2002 | Aho et al. | 455/574 |

* cited by examiner

*Primary Examiner*—Nay Maung
*Assistant Examiner*—Tilahun Gesesse
(74) *Attorney, Agent, or Firm*—Jay H. Maioli (57) ABSTRACT

A portable telephone may include an AV processing block (200), a telephone processing block (300) and a common processing block (400). A power management controller (101) may control a power supply of each block, i.e. operation and non-operation. The power management controller (101) may have connected thereto a power supply key (K1) and a power supply decision key (K2). When depressing the key (K1) sequentially, the user can repeatedly select an AV mode, a PHONE mode and an AV/PHONE mode. A user can determine the selected mode by depressing the key (K2). In the area in which a use of an electronic device which may generate electromagnetic waves is prohibited, a user can use this portable telephone in the AV mode. Also, outside the telephone service area, a user can use this portable telephone in the AV mode, thereby making it possible to avoid electric power from being uselessly consumed when the power supply of the telephone processing block (300) is held at ON state. Thus, the portable telephone of the present invention is easier to handle.

6 Claims, 9 Drawing Sheets

MULTIFUNCTION WIRELESS TELEPHONE

BACKGROUND OF THE INVENTION

1. Field of the Invention

The present invention relates to an electronic device for use with a portable telephone having an additional function to record and reproduce an audio signal and a video signal, for example. More particularly, this invention relates to an electronic device for use with a portable telephone which may become easier to handle by individually controlling a first function section for generating electromagnetic waves of a constant level and other second function section such that the first function section and the second function section may become operable and inoperable and vice versa.

2. Description of the Related Art

Heretofore, there is a portable telephone having an additional function to record and reproduce an audio signal and a video signal, for example. This portable telephone may include a section concerning a telephone function effectively utilizing radio waves and a function concerning a function to record and reproduce an audio signal and a video signal.

It is to be appreciated that a circumstance under which a portable telephone can be used and a circumstance under which an audio signal or the like can be recorded and reproduced are not always identical to each other. The following three cases (1) to (3) are known as the above-mentioned case:

(1) Use of telephones effectively utilizing radio waves is prohibited within a hospital;

(2) Use of electronic devices such as a radio receiver for generating electromagnetic waves of a level higher than a certain predetermined level is prohibited within an airplane during its flight; and (3) Underground, mountains, or the like may sometimes exist outside of so-called telephone service area.

In the cases (1) and (2), it is necessary to stop the electronic device from generating electromagnetic waves. Also, in the case of (3), there arises a user's need to avoid a limited battery capacity from being consumed uselessly. Although a power supply of the whole of the electronic device can be turned off in order to avoid the limited battery capacity from being consumed uselessly, in that case, the function other than the telephone also cannot be used. This situation may apply for the portable telephone having the additional function to record and reproduce the above-mentioned audio signal or the like and other portable telephone with a computer for handling data or the like, and a tape recorder having a built-in radio receiver as well.

SUMMARY OF THE INVENTION

It is an object of the present invention to provide an electronic device which can be made easier to handle by individually controlling the operation and the non-operation of respective function sections.

According to an aspect of the present invention, there is provided an electronic device which is comprised of one of a plurality of function sections which generate electromagnetic waves of a level higher than a predetermined level, one of a plurality of second function sections which do not generate electromagnetic waves of the level higher than the predetermined level, a selection operation means for enabling a user to select a function section to be operated and a control means for individually controlling the first and second function sections based on the selection made by this selection operation means such that the first and second function sections can be operated and cannot be operated.

In this invention, the user can select the function section to be operated from the first and second function sections by the selection operation means. The selection operation means may include a single key, for example. When a user sequentially depresses this key, the selected function section can be changed repeatedly at a constant interval. Then, the control means may operate the selected function section. Thus, in the place wherein a use of an electronic device which may generate electromagnetic waves of a level higher than a predetermined level is prohibited, it may become possible for the user to use this electronic device by placing only the second function section in the operable state. Also, when the first function section is the section concerning a telephone function effectively utilizing radio waves, outside the telephone service area, the user can place only the second function section in the operable state, thereby making it possible to avoid an electric power from being consumed uselessly during the first function section is being operated. Also, when the first function section is the section concerning the telephone function effectively utilizing radio waves, the user can place only the first function section in the operable state, thereby making it possible to extend a time in which a telephone can be used as long as possible.

The control means may start the operation of the first function section after a predetermined time elapsed since the selection operation means had selected the first function section. Also, the control means may start the operation of the first function section after the operation state in which the selection operation means selects the first function section was continued during a constant time period. Also, the control means may start the operation of the first function section after the selection operation means selected the first function section and a confirmation operation means confirmed the selection. Thus, it may become possible to prevent electromagnetic waves of a level higher than a predetermined level from being generated by the first function section which is caused to operate immediately after the first function section was selected.

In this case, when the first function section is selected by the selection operation means, a message indicating such selection of the first function section may be reported to a user. A reporting means may include a character or image display device to report a message to a user by characters or images. Alternatively, the reporting means may include an audio output device to report a message to a user by sounds. Further, the reporting means may include a vibrator to report a message to a user via vibrations generated from the vibrator. Since the message indicating that the first function section was selected may be reported to the user, it may become possible for the user to previously confirm that the first function section may be placed in the state for generating electromagnetic waves of a level higher than a predetermined level.

According to another aspect of the present invention, there is provided an electronic device which is comprised of one or a plurality of first function sections which generate electromagnetic waves of a level higher than a predetermined level, one or a plurality of second function sections which do not generate the electromagnetic waves of the level higher than the predetermined level, a control means for individually controlling the operation and the non-operation of the first and second function sections and a setting means for enabling a user to set a function section operated by the control means before a power supply is de-energized.

In accordance with this invention, a user may use the setting means to set the function section operated by the control means when the power supply is energized next time. When the above-mentioned setting is made, the control means may operate the respective function sections in accordance with the setting when the power supply is energized. Thus, the user can avoid a troublesomeness for selecting the function section operated when the power supply is energized. Therefore, the electronic device may become easier to handle. In this case, the power supply may be automatically de-energized at a previously-set time.

According to another aspect of the present invention, there is provided an electronic device which is comprised of one or a plurality of first sections which generate electromagnetic waves of a level higher than a predetermined level, one or a plurality of second function sections which do not generate the electromagnetic waves of the level higher than the predetermined level, a control means for individually controlling operation and non-operation of the first and second function sections and an operation means for enabling a user to de-energize a power supply. The control means may place only the first function section in the non-operation state when the power supply is de-energized by the operation means under the state that the first and second function sections are operated simultaneously.

In accordance with this invention, when the power supply is de-energized under the state that the first and second function sections are operated simultaneously, only the first function section which may generate the electromagnetic waves of the level higher than the predetermined level may be placed in the non-operation state. Thus, when a user enters an area in which the generation of the electromagnetic waves of the level higher than the predetermined level is prohibited, it may become possible for the user to stop the generation of the electromagnetic waves of the level higher than the predetermined level only by de-energizing the power supply without stopping the operation of the second function section which may record and reproduce an audio signal and a video signal, for example. Thus, the electronic device according to the present invention can become easier to handle.

BRIEF DESCRIPTION OF THE DRAWINGS

FIG. 2 (formed of FIGS. 2A and 2B drawn on two sheets of drawings so as to permit the use of a suitably large scale) is a flowchart to which reference will be made in explaining an example of operations concerning a power supply control made by a power management controller;

FIG. 5 (formed of FIGS. 5A and 5B drawn on two sheets of drawings so as to permit the use of a suitably large scale) is a flowchart to which reference will be made in explaining another example of operations concerning a power supply control made by a power management controller; and FIG. 6 (formed of FIGS. 6A and 6B drawn on two sheets of drawings so as to permit the use of a suitably large scale) is a flowchart to which reference will be made in explaining a further example of operations concerning a power supply control made by a power management controller.

DESCRIPTION OF THE PREFERRED EMBODIMENT

An electronic device according to an embodiment of the present invention will hereinafter be described with reference to the drawings.

Figure 1:
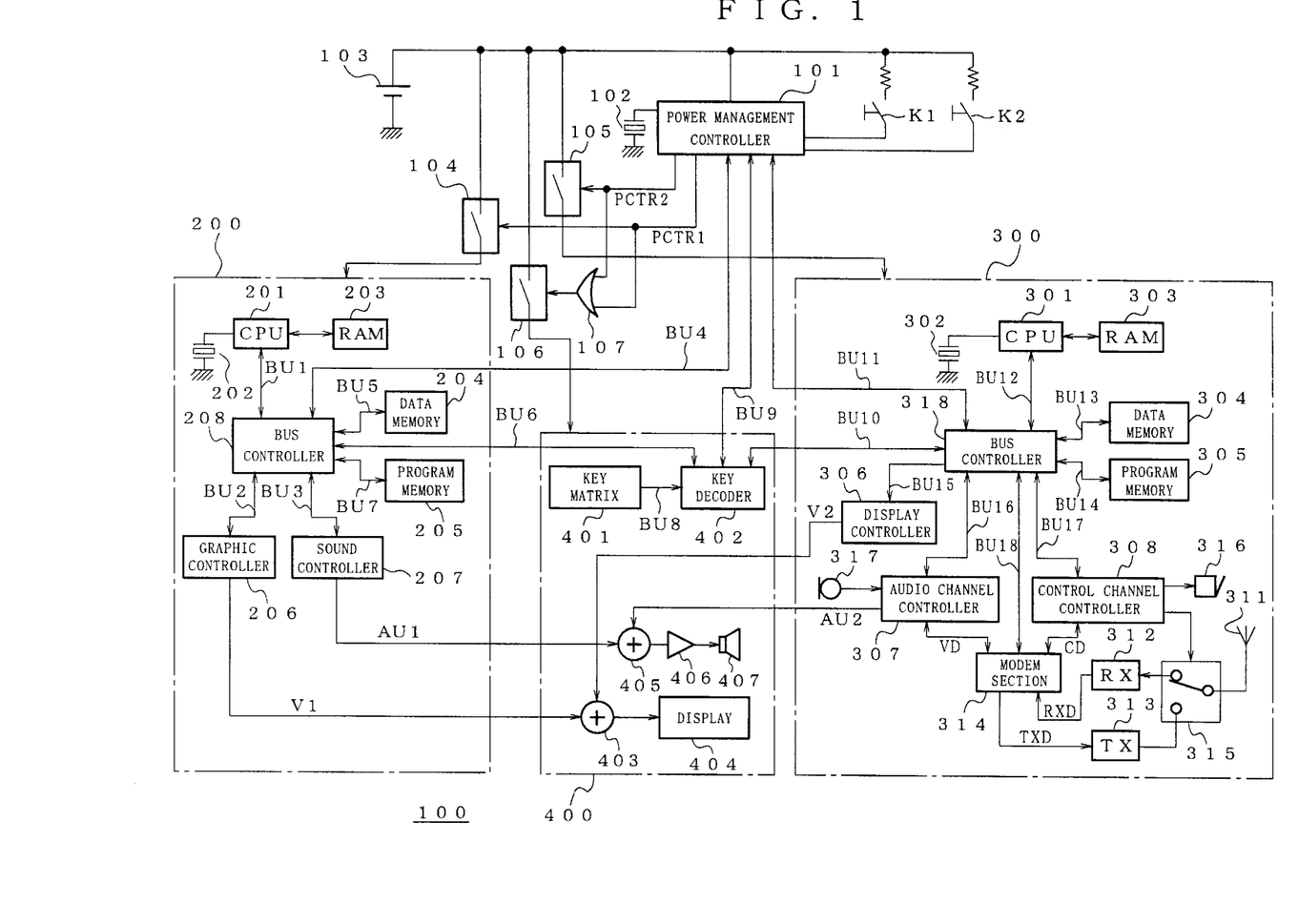
FIG. 1 is a block diagram showing an arrangement of a portable telephone according to an embodiment of the present invention.

FIG. 1 of the accompanying drawings shows in block form an arrangement of a portable telephone 100 according to an embodiment of the present invention. This portable telephone may have added thereto a reproducing function section capable of reproducing music and image.

As shown in FIG. 1, the portable telephone 100 may include an audio/video processing block (hereinafter referred to as "AV processing block") 200, a telephone processing block 300 and a common processing block 400.

The AV processing block 200 may include a CPU (central processing unit) 201 which is used in order to reproduce music data and image data. This CPU 201 may have connected thereto a clock oscillator 202 for operating the CPU 201 and a RAM (random-access memory) 203 for temporarily storing data required by the CPU 201 to process data.

Also, the AV processing block 200 may include a data memory 204 in which compression-coded music data and image data are stored, a program memory 205 in which programs for processing the above-mentioned music data and image data are stored, a graphic controller 206 for converting image data transmitted from a bus controller, which will be described later on, into an image signal V1 required by a display, which will be described later on, of a common processing block 400 and a sound controller 207 for music data transmitted from the bus controller, which will be described later on, into an analog audio signal AU1 supplied to a speaker, which will be described later on, of the common processing block 400. For example, when the display is able to display an image by inputting red, green and blue color signals and a synchronizing signal, the above-mentioned image signal V1 comprises the red, green and blue color signals and the synchronizing signal.

Also, the AV processing block 200 may include a bus controller 208 for controlling the connections of a bus BU1 connected to the CPU 201, a bus BU5 connected to the data memory 204, a bus BU7 connected to the program memory 205, a bus BU2 connected to the graphic controller 206, a bus BU3 connected to the sound controller 207, a bus BU4 connected to a power management controller, which will be described later on, and a bus BU6 connected to a key decoder of the common processing block 400 which will be described later on.

A telephone processing block 300 may process a TDD (Time Division Duplex) system telephone function. This telephone processing block 300 may include a CPU 301 which may be used in order to process the telephone function. This CPU 301 may have connected thereto a clock oscillator 302 for operating this CPU 301 and a RAM 303 for temporarily storing data required by the CPU 301 to process data.

Also, the telephone processing block 300 may include a data memory 304 in which telephone set inherent ID, its telephone number, abbreviated dial information, telephone function set data, or the like are stored, a program memory 305 in which a program for commanding telephone functions such as a call processing and a telephone added function processing and a display controller 306 for converting image data transmitted from the bus controller, which will be described later on, into an image signal V2 required by a display, which will be described later on, of the common processing block 400. This display controller 306 may be made effective by the CPU 301 when a telephone number has to be displayed, function set contents have to be displayed and a time has to be displayed, or the like.

Also, the telephone processing block 300 may include an audio channel controller 307 and a control channel controller 308. The control channel controller 308 may have connected thereto a sounder 316. When it is set such that data, which was previously stored in the data memory 304, may select the sounder 316, if the control channel controller 308 detects an incoming call, then the sounder 316 may emanate sounds. Instead of this sounder 316, a vibrator which may generate vibrations may be used or such vibrator may be used together with the sounder 316.

The audio channel controller 307 may have connected thereto a microphone 317 serving as a telephone transmitter. This microphone 317 may be used when the audio channel controller 307 is made effective by the processing of the control channel controller 308 through a bus BU17 and a bus BU16, which will be described later on, to thereby open a transmitter path. Also, this audio channel controller 307 may output an analog audio signal AU2 which is supplied to a speaker, which will be described later on, of the common processing block 400. This analog audio signal AU2 may be outputted from the audio channel controller 307 when the audio channel controller 307 is made effective by the processing of the control channel controller 308 through the bus BU17 and the bus BU16, which will be described later on, to thereby open a telephone receiver path.

Also, the telephone processing block 300 may include a modem section 314 which may extract control data CD and audio data VD in synchronism with a base station (not shown) based on reception baseband data RXD serving as burst data by executing a predetermined protocol processing and which may convert the control data CD and the audio data VD, which will be returned to the base station, into transmission baseband data TXD serving as burst data, a reception section 312 for demodulating an RF signal transmitted from the base station to provide the reception baseband data RXD, a transmission section 313 for modulating the transmission baseband data TXD to provide an RF signal which will be transmitted to the base station and an antenna switch 315 for switching a transmission and reception antenna 311 to the transmission section 313 side during the transmission interval and to the reception section 312 during the reception interval. The switching of this antenna switch 315 may be controlled by the control channel controller 308.

Also, the telephone processing block 300 may include a bus controller 318 for controlling the connections of a bus BU12 connected to the CPU 301, a bus BU13 connected to the data memory 304, a bus BU 14 connected to the program memory 305, a bus BU15 connected to the display controller 306, a bus BU17 connected to the control channel controller 308, a bus BU16 connected to the audio channel controller 307, a bus BU18 connected to the modem section 314, a bus BU11 connected to a power management controller, which will be described later on, and a bus BU10 connected to a key decoder, which will be described later on, of the common processing block 400.

The common processing block 400 may include a key matrix 401 used by a user to enter a variety of data (excepting data for turning on and off a power supply and for determining a power supply) and a key decoder 402 for decoding data indicating the kind of key depressed by this key matrix 401. The key matrix 401 may be replaced with an input device such as a jog dial.

The key decoder 402 may be controlled by a power management controller, which will be described later on, through the bus BU9, and may be operated as follows. When a control signal PCTR1, which will be described later on, may be enabled (high level) to supply a power to the AV processing block 200 and a control signal PCTR2 may be disabled (low level) so that a power may not be supplied to the telephone processing block 300, the bus BU6 may be enabled with respect to the input/output, and the output terminal on the key decoder 402 side may be disabled with respect to the bus BU10 connected to the input terminal (bus controller 318) in which the power supply may be disconnected by the control signal PCTR2.

Also, when the control signal PCTR2 is enabled to supply a power to the telephone processing block 300 and the control signal PCTR1 is disabled to stop the supply of the power to the AV processing block 200, both of the bus BU10 may be enabled. However, with respect to the bus BU6 connected to the input terminal (bus controller 208) in which the power supply is disconnected by the control signal PCTR1, the output terminal of the key decoder 402 side is disabled.

Also, when both of the control signal s PCTR1, PCTR2 are enabled, both of the input and the output of the bus BU6, the bus BU10 are enabled. When both of the control signals PCTR1, PCTR2 are disabled, since the power is not supplied to the common processing block 400 as will be described later on, both of the input and the output of the bus BU6 and the bus BU10 are disabled.

The reason that the output terminal is disabled is as follows. Since a CMOS (complementary metal-oxide semiconductor) integrated circuit is generally used, if the power supply of this circuit is disconnected, then when the power supply is turned on, the input terminal that is held at the high impedance state also is held at the low impedance state. Therefore, if the output terminal is held at the enabled state, then when the output goes to the high level, an excess current may flow through the input terminal, which may cause a circuit operation to become unstable or which leads to a device failure.

The common processing block 400 may include a mixer 403 which may mix the image signal V1 from the graphic controller 206 of the AV processing block 200 and the image signal V2 from the display controller 306 of the telephone processing block 300 and a display 404 formed of a liquid-crystal display device or the like to display an image based on the image signal from this mixer 403.

The common processing block 400 may further include a mixer 405 for mixing an analog audio signal AU1 from the sound controller 207 of the AV processing unit 200 and an analog audio signal AU2 from the channel controller 307 of the telephone processing unit 300, an amplifier 406 for amplifying the audio signal from this mixer 405 to a proper level and a speaker 407 for emanating sounds based on the audio signal amplified by this amplifier 406. This speaker 407 may be served also as a telephone receiver.

In the above-mentioned arrangement, the manner in which the AV processing block 200 will reproduce a piece of music and an image will be described in brief. When a user may select a piece of music to be reproduced by operating keys in the key matrix 401, selected information may be supplied through the bus BU6 and the bus controller 208 from the key decoder 402 to the CPU 201. Then, music data of the selected piece of music may be read out from the data memory 204. The music data may be decoded by the processing in the CPU 201, and then supplied to the sound controller 207. Then, the analog audio signal AU1 of the selected piece of music may be outputted from the sound controller 207 and supplied to the speaker 407 of the common processing block 400, whereby sounds of the selected music may be emanated from the speaker 407.

The manner in which the AV processing block will reproduce an image will be described. When a user may select an image to be reproduced by operating keys in the key matrix 401, selected information may be supplied from the key decoder 402 through the bus BU8 and the bus controller 208 to the CPU 201. Then, data of the selected image may be read out from the data memory 203. Thereafter, such data may be decoded by the processing in the CPU 201, and may be then supplied to the graphic controller 206. Then, the image signal V1 of the selected image may be outputted from the graphic controller 206 and supplied to the display 404 of the common processing block 400, whereby the selected image may be displayed on the display 404.

The manner in which the telephone processing block 300 will implement the operation of the telephone function will be described next. When a user may make an outgoing call operation by the key matrix 401, such outgoing call operation information may be supplied from the key decoder 402 through the bus BU10 and the bus controller 318 to the CPU 301. Then, the control channel controller 308 may execute an outgoing call processing, and a telephone communication state may be established when the called person may answer the incoming call. Also, when an incoming call may be detected by the control channel controller 308, the sounder 316 may emanate sounds. In this state, when the user may make an answering operation by the key matrix 401, such information may be supplied from the key decoder 402 through the bus BU10 and the bus controller 318 to the CPU 301. Thus, the control channel controller 308 may execute an answer processing, thereby resulting in a telephone communication state being made.

In this telephone communication state, by the processing in the control channel controller 308, the audio channel controller 307 may become effective through the bus BU17 and the bus BU16, thereby resulting in the transmission path and the reception path being opened. In this state, the audio signal inputted from the microphone 317 may be outputted from the audio channel controller 307 as audio data VD. This audio data VD may be supplied to the modem section 314, from which it may be transmitted to the called person. On the other hand, audio data from the called person may be extracted by the modem section 314, and this audio data VD may be supplied to the audio channel controller 307. Then, the analog audio signal AU2 corresponding to such audio data VD may be outputted from the audio channel controller 307. This analog audio signal AU2 may be supplied to the speaker 407 of the common processing block 400, from which received sounds may be outputted.

Also, the display controller 306 may be made effective when the telephone number should be displayed, the function set contents should be displayed and a time should be displayed as described above. Then, the image signal V2 outputted from this display controller 306 may be supplied to the display 404 of the common processing block 400, thereby resulting in the telephone number being displayed.

Sections concerning the power control in the portable telephone 100 will be described next. Specifically, the portable telephone 100 may include a power management controller 101 for controlling a power supply. The power management controller 101 will hereinafter be simply referred to as "PM controller 101". This PM controller 101 may have connected thereto a clock oscillator 102 for enabling the PM controller 101 to be operated. This PM controller 101 may be constantly supplied with a power and the clock oscillator 102 may be constantly oscillated.

Also, the battery 103 may be connected through a connection switch 104 to the AV processing block 200 and may be connected through a connection switch 105 to the telephone processing block 300. The battery 103 may further be connected through a connection switch 106 to the common processing block 400. The connection switches 104, 105 may be turned on and off under control of the control signals PCTR1, PCTR2 outputted from the PM controller 101, respectively. The control signals PCTR1, PCTR2 may be supplied to an OR circuit 107, and an output signal from this OR circuit 107 may be supplied to the connection switch 106 as a control signal which may be used to turn on and off the connection switch 106. The connection switches 104 to 106 may be turned on when the control signal goes to the enabled state (high level) and may be turned off when the control signal goes to the disabled state (low level).

Also, the PM controller 101 may have connected thereto a power supply key K1 and a power decision key K2, each of which may be comprised of a push-button switch. In this case, one end of the keys K1, K2 may be connected through resistors to the positive side of the battery 103, and the other ends thereof may be connected to the PM controller 101. Although not shown, the PM controller 101 may incorporate therein a chattering elimination circuit with respect to these keys K1, K2. Thus, only when the key state is decided during a certain period of time, it may be determined by the chattering elimination circuit that the key is depressed.

The manner in which the PM controller 101 may control the power will be described with reference to flowcharts shown in FIG. 2 (formed of FIGS. 2A and 2B drawn on two sheets of drawings so as to permit the use of a suitably large scale).

Figure 2A:
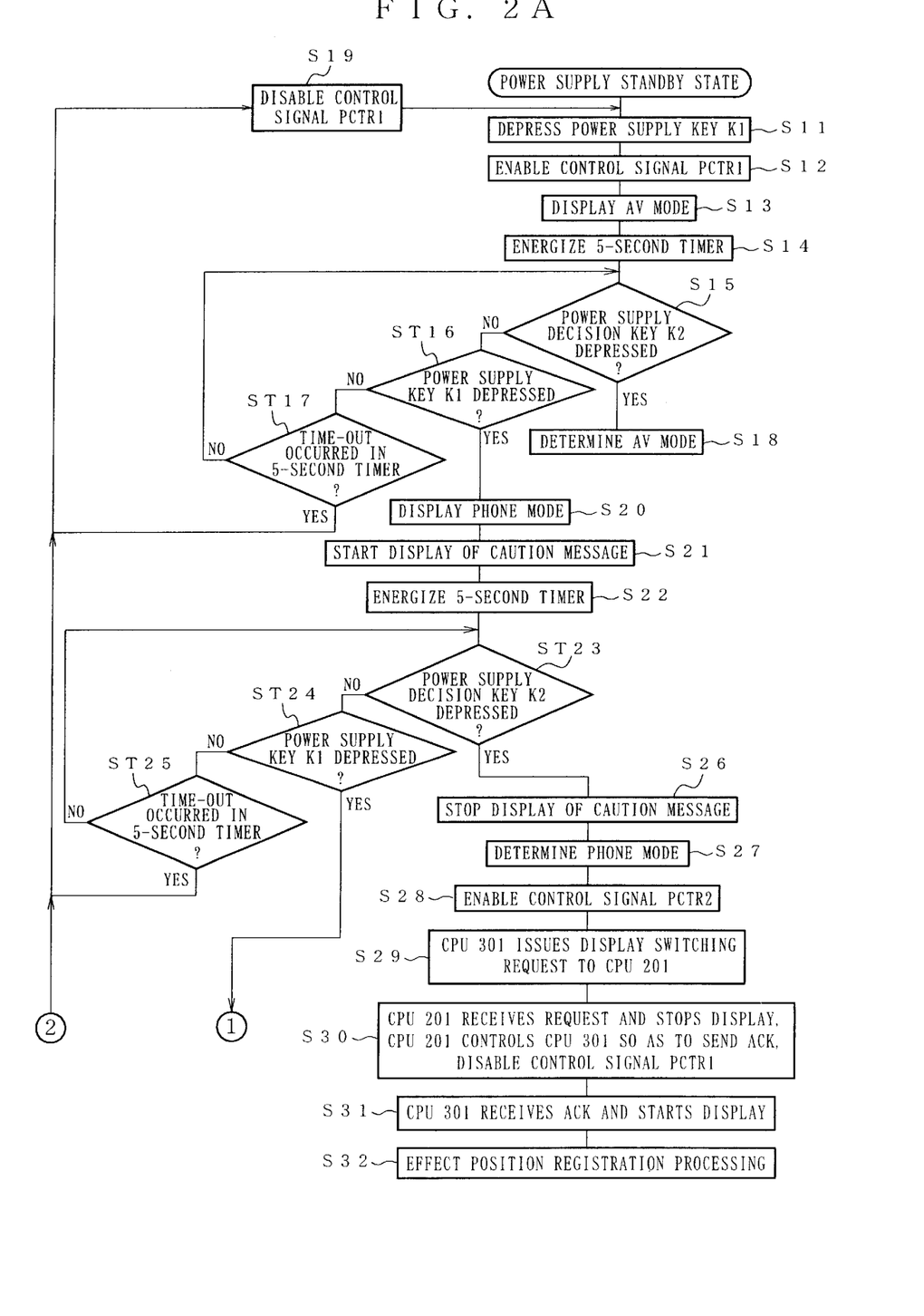

Initially, referring to FIG. 2A, in the power supply standby state, when the power supply key K1 may be depressed at a step S11, control goes to a step S12, whereat the control signal PCTR1 may be set to the enabled state (high level). In the power supply standby state, since both of the control signals PCTR1, PCTR2 may be disabled (low level), no power is supplied to any of the AV processing block 200, the telephone processing block 300 and the common processing block 400 and hence, they may not be operated. That is, in the power supply standby state, only the PM controller may be placed in the operable state.

At the step S12, the control signal PCTR2 may be enabled, whereby the connection switch 104 may be turned on. Thus, the power may be supplied from the AV processing block 200 from the battery 103, and this AV processing block 200 may be placed in the operable state. In this case, since the control signal which may be supplied to the connection switch 106 from the OR circuit 107 also may be enabled, the power may be supplied to the common processing block 400 from the battery 103, thereby resulting in this common processing block 400 being placed in the operable state. In the next step S13, the PM controller 101 may control the CPU 201 of the AV processing block 200 through the bus BU4 such that the CPU 201 may operate the program in order to display a power supply on processing state to thereby display a message indicating an AV mode (mode in which the AV processing block 200 becomes the operable state) on the display 404 of the common processing block 400.

As the operation mode, there may be available a PHONE mode (mode in which the telephone processing block 300 may be placed in the operable state) and an AV/PHONE mode (mode in which both of the AV processing block 200 and the telephone processing block 300 may be placed in the operable state) in addition to the AV mode. For example, the display 404 may display "AUDIO/VIDEO ON" in the AV mode and "PHONE ON" in the PHONE mode and "AUDIO/VIDEO/PHONE ON" in the AV/PHONE mode. Alternatively, the display 404 may display icons corresponding to the above-mentioned respective modes. Further, instead of displaying the respective modes on the display 404, the modes may be informed to the user by means of sounds.

Thereafter, at a step S14, a 5-second timer may be energized. Then, control goes to the next decision step S15, whereat it may be determined whether or not the power supply decision key K2 is depressed. If the power supply decision key K2 is not depressed as represented by a NO at the decision step S15, then control goes to the next decision step S16, whereat it is determined whether or not the power supply key K1 is depressed. If the power supply key K1 is not depressed as represented by a NO at the decision step S16, then control goes to the next decision step S17, whereat it is determined whether or not a time-out occurred in the 5-second timer. If the power supply decision key K2 is depressed as represented by a YES at the decision step S15 before the time-out occurs in the 5-second timer, then control goes to a step S18, whereat the AV mode is decided. If the power supply decision key K2 is not depressed as represented by a NO at the decision step S15, if the power supply key K1 is not depressed as represented by a NO at the decision step S16 and if the time-out occurred at the step S17 as represented by a YES at the decision step S17, then control goes to a step S19, whereat the control signal PCTR1 is disabled (low level) and the connection switch 104 is de-energized to thereby stop the supply of the power to the AV processing block 200 and the common processing block 400. Then, control goes back to the power supply standby state.

Also, if the power supply key K1 is depressed as represented by a YES at the decision step S16 before the time-out occurs in the 5-second timer, then control goes to a step S20, whereat the program for displaying the power supply ON-state is effected on the CPU 21 of the AV processing block 200 to thereby display a message of PHONE mode on the display 404 of the common processing block 400. Then, control goes to a step S21, whereat a caution of a message indicating the generation of electromagnetic waves may be displayed on the display 404 of the common processing block 400. For example, there may be displayed "THIS MODE MAY GENERATE ELECTROMAGNETIC WAVES AND PLEASE DO NOT TURN ON SWITCH IN THE PROHIBITED PLACE" on the display 404. In this case, instead of displaying a message of PHONE mode on the display 404, the selection of the PHONE mode may be reported to the user via sounds or vibrations generated by the vibrator. This may apply for the case in which the AV/PHONE mode is selected as well.

Thereafter, control goes to a step S22, whereat the 5-second timer is energized. Control goes to the next decision step S23, whereat it is determined whether or not the power supply decision key K2 is depressed. If the power supply decision key K2 is not depressed as represented by a NO at the decision step S23, the control goes to a step S24. It is determined at the step S24 whether or not the power supply key K1 is depressed. If the power supply key K1 is not depressed as represented by a NO at the decision step S24, then control goes to the next decision step S25. It is determined at the decision step S25 whether or not a time-out occurred in the 5-second timer. If the power supply decision key K2 is depressed as represented by a YES at the decision step S23 before a time-out occurs in the 5-second timer, then control goes to a step S26, whereat the display of the caution message on the display 404 at the above-mentioned step S21 is stopped. Then, control goes to a step S27, whereat the PHONE mode may be decided.

Then, in a step S28, the control signal PCTR2 may be enabled (high level). When the control signal PCTR2 may be held at the enabled state, the connection switch 105 may be turned on to supply the power from the battery 103 to the telephone processing block 300, whereby this telephone processing block 300 may be placed in the operable state. Control goes to the next step S29, whereat message information indicating that the display controller 306 was placed in the usable state may be reported through the bus BU11 to the CPU 301 of the telephone processing block 300. Also, this CPU 301 may be controlled so as to issue a display switching request to the CPU 201 of the AV processing block 200. This display switching request may be transmitted to the CPU 201 from the CPU 301 through the bus BU12, the bus BU11, the PM controller 101, the bus BU4 and the bus BU1, in that order.

When the CPU 202 may receive the above-mentioned display switching request at a step S30, the CPU 201 may stop the display operation, and may control the CPU 301 such that the CPU 301 may transmit an ACK (acknowledgment) in the opposite route. At that very moment, the PM controller 101 may disable the control signal PCTR1. As a result, the connection switch 104 may be de-energized to interrupt the supply of the power from the battery 103 to the AV processing block 200 so that the AV processing block 200 may be placed in the non-operation state.

Thereafter, at a step S31, the CPU 301 of the telephone processing block 300 may be controlled on the basis of the reception of the ACK from the CPU 201 of the above-mentioned AV processing block 200 so that the display of the PHONE mode may be started on the display 404 of the common processing block 400. In this case, the display controller 306 may output the image signal V2 for displaying the PHONE mode. When the PHONE mode need not be displayed continuously, the display switching operations on the above-mentioned steps S29 to S31 need not be executed, and it is sufficient that the control signal PCTR1 may be disabled.

Thereafter, at a step S32, a position registration processing may be executed in the telephone processing block 300. Specifically, in the telephone processing block 300, in order to effect the position registration on the base station in accordance with a predetermined communication protocol, the reception unit 312 may be enabled to start the reception so as to confirm the existence of the base station. If a desired base station may be discovered, then the transmission station 313 may be enabled to transmit data to the base station at a predetermined timing. When any one of the reception section 312 and the transmission section 313 may be enabled, there may be generated electromagnetic waves of a level such that the electromagnetic waves thus generated will affect aeronautical electronic devices. Further, when the transmission section 313 may be enabled, there may be generated electromagnetic waves of a level such that the electromagnetic waves thus generated will affect medical electronic devices.

If the power supply decision key K2 is not depressed as represented by a NO at the decision step S15, if the power supply key K1 also is not depressed as represented by a NO at the decision step S16 and if the time-out occurred in the 5-second timer as represented by a YES at the decision step S25, then control goes back to the step S19, whereat the control signal PCTR1 may be disabled (low level). Then, after the supply of the power to the AV processing block 200 and the common processing block 400 is stopped by de-energizing the connection switch 104, control goes back to the power supply standby state.

If the power supply key K1 is depressed as represented by a YES at the decision step S24 before the time-out occurs in the 5-second timer, then control goes to a step S35 (FIG. 2B), whereat the CPU 201 of the AV processing block 200 may be controlled so as to operate a program to display the power supply ON processing state, and a message indicating AV/PHONE mode may be displayed on the display 404 of the common processing block 400. Then, control goes to the next step S37, whereat the 5-second timer is energized. Then, control goes to the next decision step S38, whereat it is determined whether or not the power supply decision key K2 was depressed. If the power supply decision key K2 was not depressed as represented by a NO at the decision step S38, then control goes to the next decision step S39. In the decision step S39, it is determined whether or not the power supply key K1 was depressed. If the power supply key K1 was not depressed as represented by a NO at the decision step S39, then control further goes to the next decision step S40. It is determined at the decision step S40 whether or not a time-out occurred in the 5-second timer. If the power supply decision key K2 was not depressed as represented by a NO at the decision step S38, if the power supply key K1 was not depressed as represented by a NO at the decision step S39 and if the time-out occurred in the 5-second timer as represented by a YES at the decision step S40, then control goes back to the step S19, whereat the control signal PCTR1 is disabled (low level) to thereby de-energize the connection switch 104. Thus, after the supply of the power to the AV processing block 200 and the common processing block 400 is stopped, control goes back to the power supply standby state.

If the power supply decision key K2 is depressed as represented by a YES at the decision step S38 before the time-out occurs in the 5-second timer, then control goes to a step S41, whereat the caution displayed on the display 404 at the above-mentioned step S21 is stopped. Then, control goes to the next step S42, whereat the AV/PHONE mode may be determined. Then, control goes to a step S43, whereat the control signal PCTR2 may be enabled (high level). When the control signal PCTR2 is enabled, the connection switch 105 may be energized to supply the power from the battery 103 to the telephone processing block 300, whereby this telephone processing block 300 may be placed in the operable state. Then, control goes to a step S44, whereat information indicating that the display controller 306 may be placed in the usable state may be reported to the CPU 301 of the telephone processing block 300, and this CPU 301 may be controlled so as to output the display switching request to the CPU 201 of the AV processing block 200.

Thereafter, when the CPU 201 receives the above-mentioned display switching request at the step S45, the CPU 201 may be controlled so as to stop the display operation, and the CPU 301 may be controlled so as to transmit an ACK (acknowledgment). Then, at a step S46, on the basis of the ACK received from the CPU 201 of the above-mentioned AV processing block, the CPU 301 of the telephone processing block 300 may control the common processing block 400 such that the display 404 of the common processing block 400 may start the display of the AV/PHONE mode. In the AV/PHONE mode, since the AV processing block 200 is still being operated, the steps S44 to S46 can be removed. Then, control goes to a step S47, whereat the position registration processing may be executed in the telephone processing block 300.

As described above, in this embodiment, by sequentially depressing the power supply key K1, the user can repeatedly select the AV mode, the PHONE mode and the AV/PHONE mode. Therefore, since the power supply key need not be prepared at every function, the portable telephone according to this invention can be made compact in size and the operability of the portable telephone can be improved. Also, in the place in which the use of an electronic device which may generate electromagnetic wave of a level higher than a predetermined level is prohibited, the portable telephone according to this invention can be used under the condition that only the AV processing block 200 may be made operable. Also, outside the telephone service area, only the AV processing block 200 can be placed in the operable state and the telephone processing block 300 is being operated, thereby avoiding an electric power from being consumed uselessly. Furthermore, since only the telephone processing block 300 can be placed in the operable state, a time in which this portable telephone is in use can be extended as long as possible.

Also, in the PHONE mode and the AV/PHONE mode, such mode is selected by depressing the power supply key K1 and such selected mode is determined by depressing the power supply decision key K2, whereupon the telephone processing block 300 can be placed in the operable state. Accordingly, it is possible to prevent electromagnetic waves of a level higher than a predetermined level from being generated by the telephone processing block 300 which may be operated immediately after the PHONE mode or the AV/PHONE was selected. Further, since the mode in which electromagnetic waves will be generated may be displayed on the display 404 when the PHONE mode or the AV/PHONE mode is selected, in the place wherein the use of electromagnetic waves may be prohibited, it is possible to prevent a user from placing the telephone processing block 300 in the operable state by depressing the power supply decision key K2 inadvertently.

Further, according to the embodiment of the present invention, when the power supply of the AV mode, the PHONE mode or the AV/PHONE mode is placed in the ON state, before the power supply is de-energized, a user can set a mode obtained next time the power supply is energized, and can set an automatic power-on and its time and date. Although not shown, the power supply in each mode can be de-energized by depressing the power supply key K1, for example. As will be described later on, the portable telephone according to this embodiment may be temporarily moved to the AV mode by depressing the power supply key K1 in the AV/PHONE mode, and then the portable telephone may be placed in the power supply standby state by depressing the power supply key K1.

The manner in which various modes may be set under control of the CPU 201 or the CPU 301 will be described with reference to FIG. 3.

Figure 3:
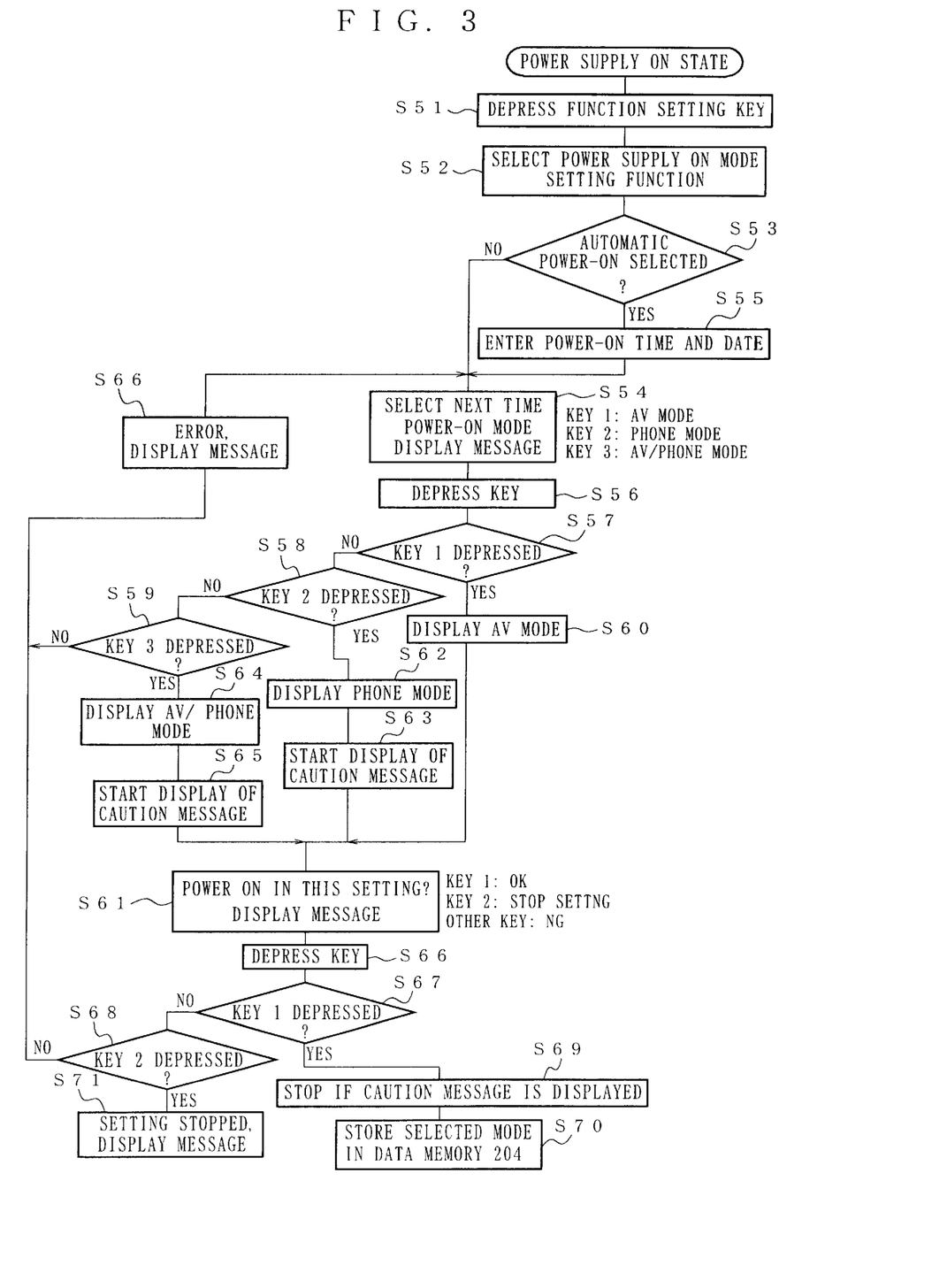
FIG. 3 is a flowchart to which reference will be made in explaining operations for setting modes, or the like when a power supply is energized next time.

Referring to FIG. 3, and following the power-on of the power supply, a function setting key (not shown) of the key matrix 401 is depressed at a step S51. Then, control goes to a step S52, whereat a power-on mode setting function is selected. Control goes to the next decision step S53, whereat it is determined whether or not an automatic power-on mode is selected. The items to be selected may be displayed on the display 404 of the common processing block 400, and the user can select a desired item while visually confirming selection items displayed on the display 404. If the automatic power-on mode is not selected as represented by a NO at the decision step S53, then control goes to a step S54. If on the other hand the automatic power-on mode is selected as represented by a YES at the decision step S53, then control goes to a step S55, whereat the user may enter a power-on time and date by operating the keys on the key matrix 401, whereafter control goes to the step S54.

At the step S54, a message urging the user to select a desired mode, such as "SELECT MODE AVAILABLE NEXT TIME POWER SUPPLY IS TURNED ON. KEY 1: AV MODE. KEY 2: PHONE MODE, KEY 3: AV/PHONE MODE" may be displayed on the display 404 of the common processing block 400. Then, control goes to a step S56, whereat a user may depress a desired key of the above-mentioned keys 1, 2 and 3. It is determined at the next decision step S57 whether or not the depressed key is the key 1. If the depressed key is not the key 1 as represented by a NO at the decision step S57, then control goes to the next decision step S58. It is determined at the decision step S58 whether or not the depressed key is the key 2. If the depressed key is not the key 2 as represented by a NO at the decision step S58, then control goes to the next decision step S59. It is determined at the decision step S59 whether or not the key 3 is depressed.

If the key 1 is depressed as represented by a YES at the decision step S57, then control goes to a step S60, whereat a message indicating that the AV mode was selected may be displayed on the display 404 of the common processing block 400. Then, control goes to a step S61. If the key 2 is depressed as represented by a YES at the decision step S58, then control goes to a step 62, whereat a message indicating that the PHONE mode was selected may be displayed on the display 404 of the common processing block 400. Then, control goes to a step S63, whereat a caution message indicating the mode in which electromagnetic waves will be generated may be displayed on the display 404 of the common processing block 400. Then, control goes to the step S61. Further, if the key 3 is depressed as represented by a YES at the decision step S59, then control goes to a step S64, whereat a message indicating that the AV/PHONE mode was selected may be displayed on the display 404 of the common processing block 400. Then, control goes to a step S65, whereat a caution message indicating that electromagnetic waves will be generated may be displayed on the display 404 of the common processing block 400. Then, control goes to the step S61. If another key other than the keys 1, 2 and 3 is depressed, then control goes to a step S66, whereat a message of "ERROR" may be displayed on the display 404 of the common processing block 400. Thereafter, control goes back to the step S54, whereat the user is again urged to select a desired mode.

In the step S61, a message for urging the user to confirm the user's selection of the mode, such as "SWITCH ON BY THIS SETTING? KEY 1: OK, KEY 2: SETTING STOPPED, OTHER KEY: NG" may be displayed on the display 404 of the common processing block 400. Control goes to the next step S66, whereat the user depresses the key. It is then determined at the next decision step S67 whether or not the key 1 is depressed. If the key 1 is depressed, then control goes to a step S69. If the key 1 is not depressed as represented by a NO at the decision step S67, then control goes to the next decision step S68. It is determined at the decision step S68 whether or not the key 2 is depressed. If the key 2 is not depressed as represented by a NO at the decision step S68, then control goes back to the step S66.

If the key 1 is depressed as represented by a YES at the decision step S67, then control goes to a step S69. In the step S69, if a caution message is displayed on the display 404 of the common processing block 400, then the display of such caution message may be stopped, whereafter control goes to a step S70. At the step S70, the selected mode may be stored in the data memory 204 of the AV processing block 200, and the portable telephone may be returned to the state obtained before the above-mentioned function setting key is depressed. If the key 2 is depressed as represented by a YES at the decision step S68, then control goes to a step S71, whereat a message indicating "SETTING STOPPED" may be displayed on the display 404 of the common processing block 400, and then the portable telephone 100 may be returned to the state obtained before the above-mentioned function setting key is depressed. If another key is depressed, then control goes back through the step S66 to the step S57, whereat the user may be again urged to select a desired mode.

When the mode in the next time power-on is set in the setting operation shown in FIG. 3, the above-mentioned PM controller 101 may control the power supply as follows. Specifically, when the AV mode is set, after the step S12 shown in FIG. 2A, control goes to the step S13, and then control goes to the step S18 immediately. The following steps may be executed similarly as described above. Also, when the PHONE mode is set, immediately after the step S12 shown in FIG. 2A, control goes to the step S20, and the following steps may be executed similarly as described above. Further, when the AV/PHONE mode is set, immediately after the step S12 shown in FIG. 2A, control goes to the step S35 (FIG. 2B), and the following steps may be executed similarly as described above.

In the setting operation shown in FIG. 3, when the mode in the next time power-on may be set, control immediately goes to the steps in which the portable telephone 100 may be placed in the mode thus set under power supply control of the PM controller 101. Therefore, the user need not execute the mode selection operation by depressing the power supply key K1 when the power supply is energized. Thus, the user can avoid such troublesome operation and hence the portable telephone according to the present invention may become easier to handle. In the setting operation shown in FIG. 3, when the user selects the automatic power-on state and sets the time and date of such automatic power-on state, the PM controller 101 may start the processing of the step S12 at the time and date thus set.

Further, according to the embodiment of the present invention, when the portable telephone 100 is set to the AV/PHONE mode, if the user depresses the power supply key K1, then the portable telephone 100 may be placed in the AV mode. The manner in which the mode of the portable telephone 100 is changed under control of the PM controller 101 will be described with reference to a flowchart of FIG. 4.

Figure 4:
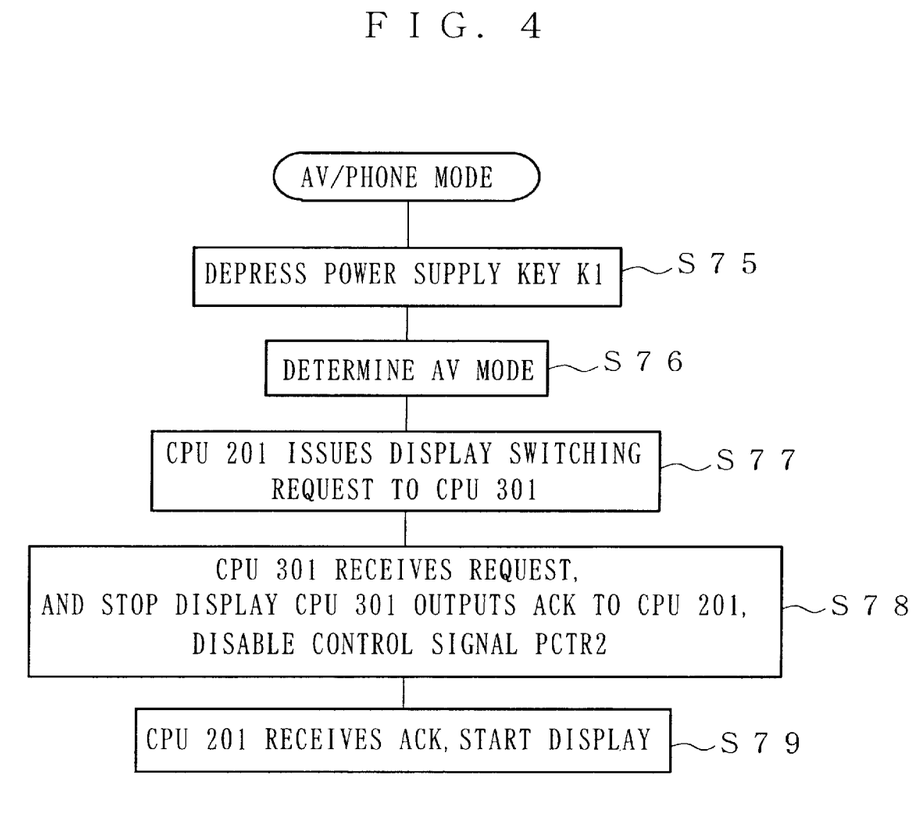
FIG. 4 is a flowchart to which reference will be made in explaining the manner in which the electronic device moves from one mode to another.

Referring to FIG. 4, and following the AV/PHONE mode, control goes to a step S75, whereat the user depresses the power supply key K1. Then, control goes to a step S76, whereat the user decides the AV mode. Thereafter, at a step S77, the CPU 201 in the AV processing block 200 may be controlled such that the CPU 201 may issue the display switching request to the CPU 301 of the telephone processing block 300.

Then, at step S78, when the CPU 301 receives the above-mentioned display switching request, the CPU 301 may stop the display operation, and may control the CPU 201 such that the CPU 201 may transmit the ACK (acknowledgment) to the CPU 301 in the opposite route. At that very moment, the PM controller 101 may disable the control signal PCTR2. Thus, the connection switch 105 may be de-energized to stop the supply of the power from the battery 103 to the telephone processing block 300 so that the telephone processing block 300 may be placed in the non-operation state.

Thereafter, at a step S79, based on the ACK received from the CPU 301 of the above-mentioned telephone processing block 300, the CPU 201 of the AV processing block 200 may be controlled in such a manner that the display of the AV mode on the display 404 of the common processing block 400 may be started. In the AV/PHONE mode, when the CPU 301 of the telephone processing block 300 may not execute the display control and the CPU 201 of the AV processing block 200 may execute the display control, the display switching operations at the above-mentioned steps S77 to S79 need not be executed, and it is sufficient that only the control signal PCTR2 may be disabled.

As described above, in the AV/PHONE mode, when the user depresses the power supply key K1, the portable telephone can be moved to the AV mode. Therefore, under the state that a piece of music or an image is being reproduced in the AV/PHONE mode, when the user enters the place in which the generation of electromagnetic waves is prohibited, the user can stop the generation of electromagnetic waves by depressing the power supply key K1 without stopping the reproduction of the music or the image. Thus, the portable telephone according to the present invention may become easier to handle.

Figure 2B:
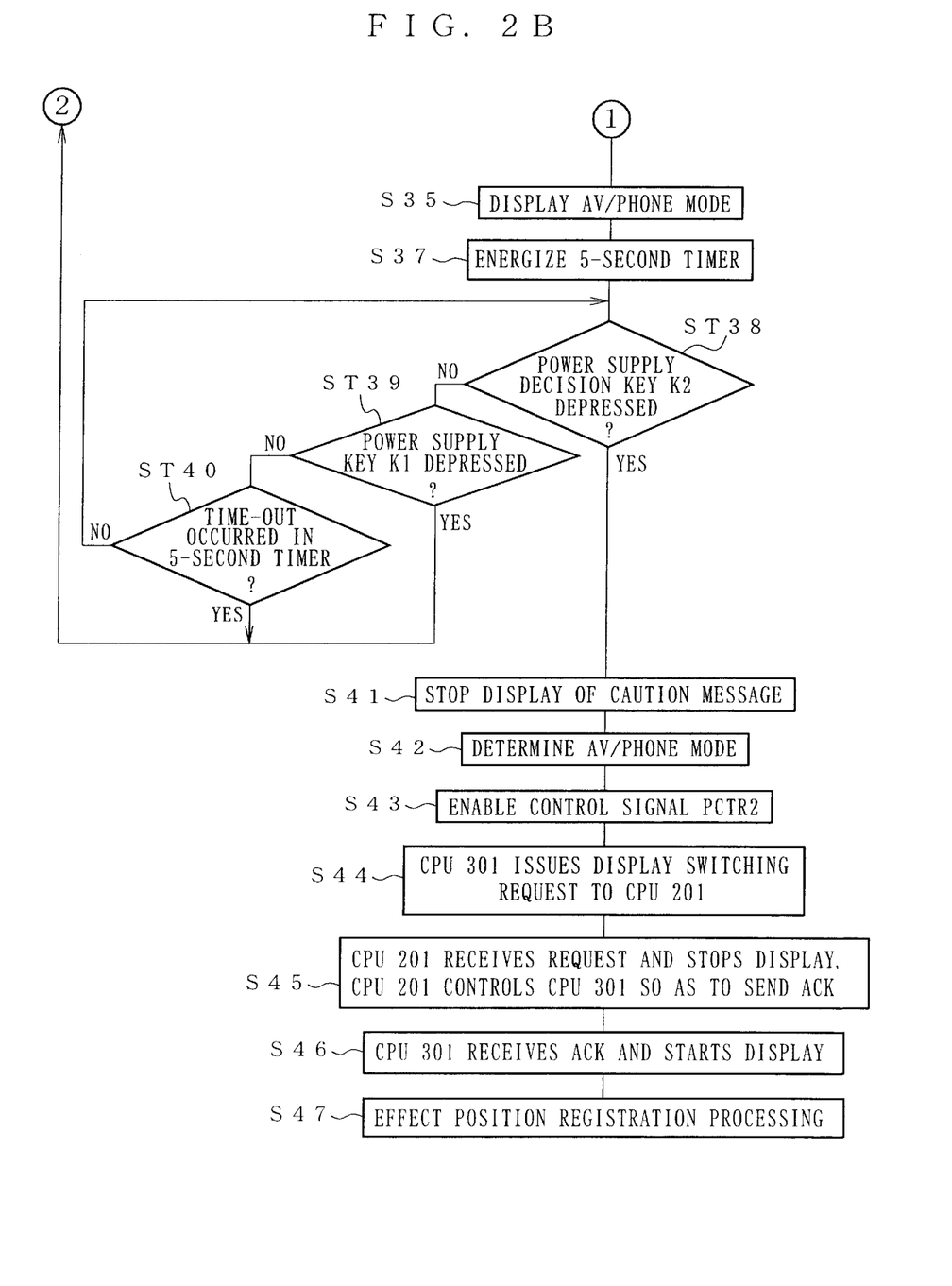
Figure 5A:
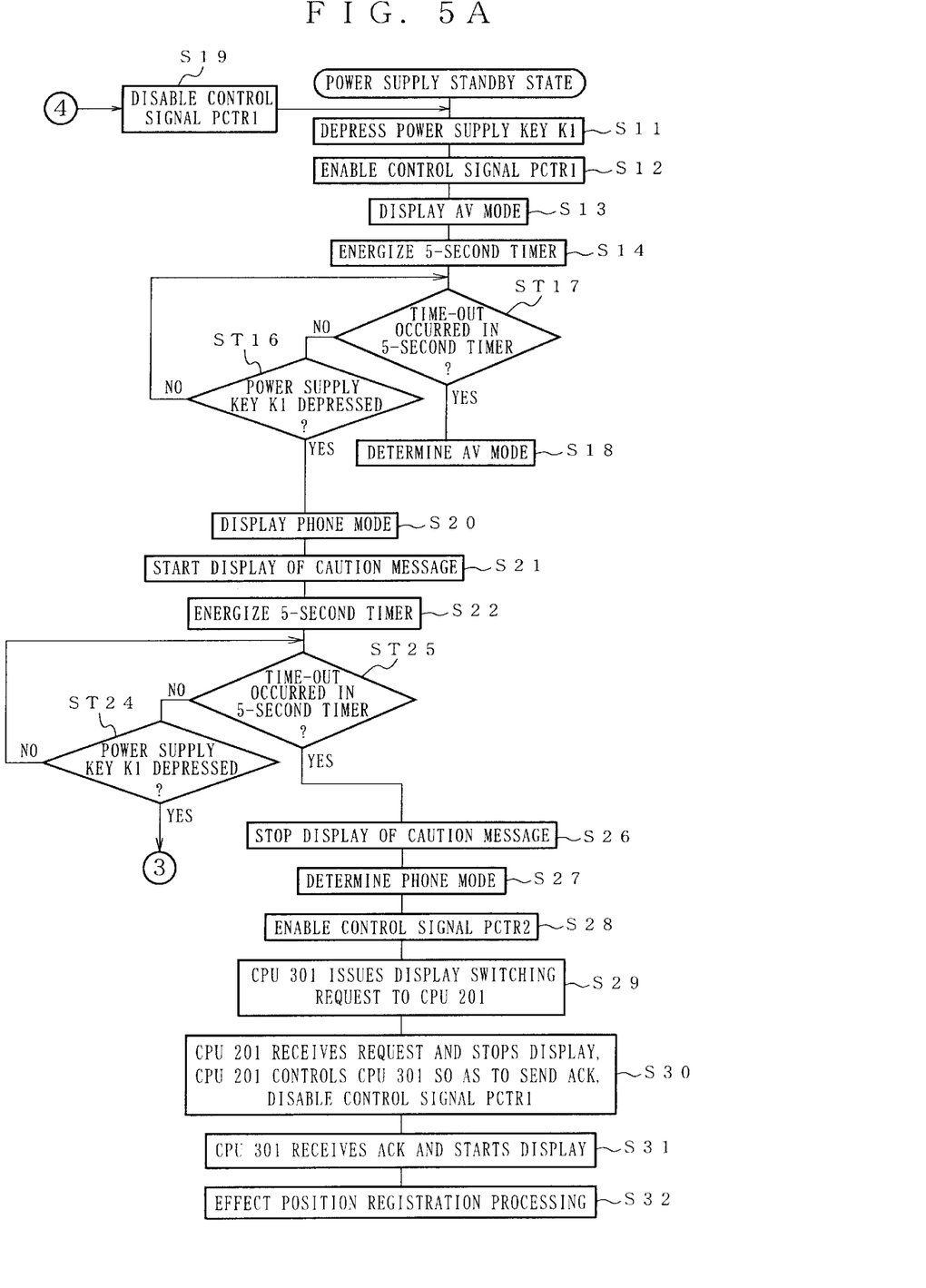
Figure 5B:
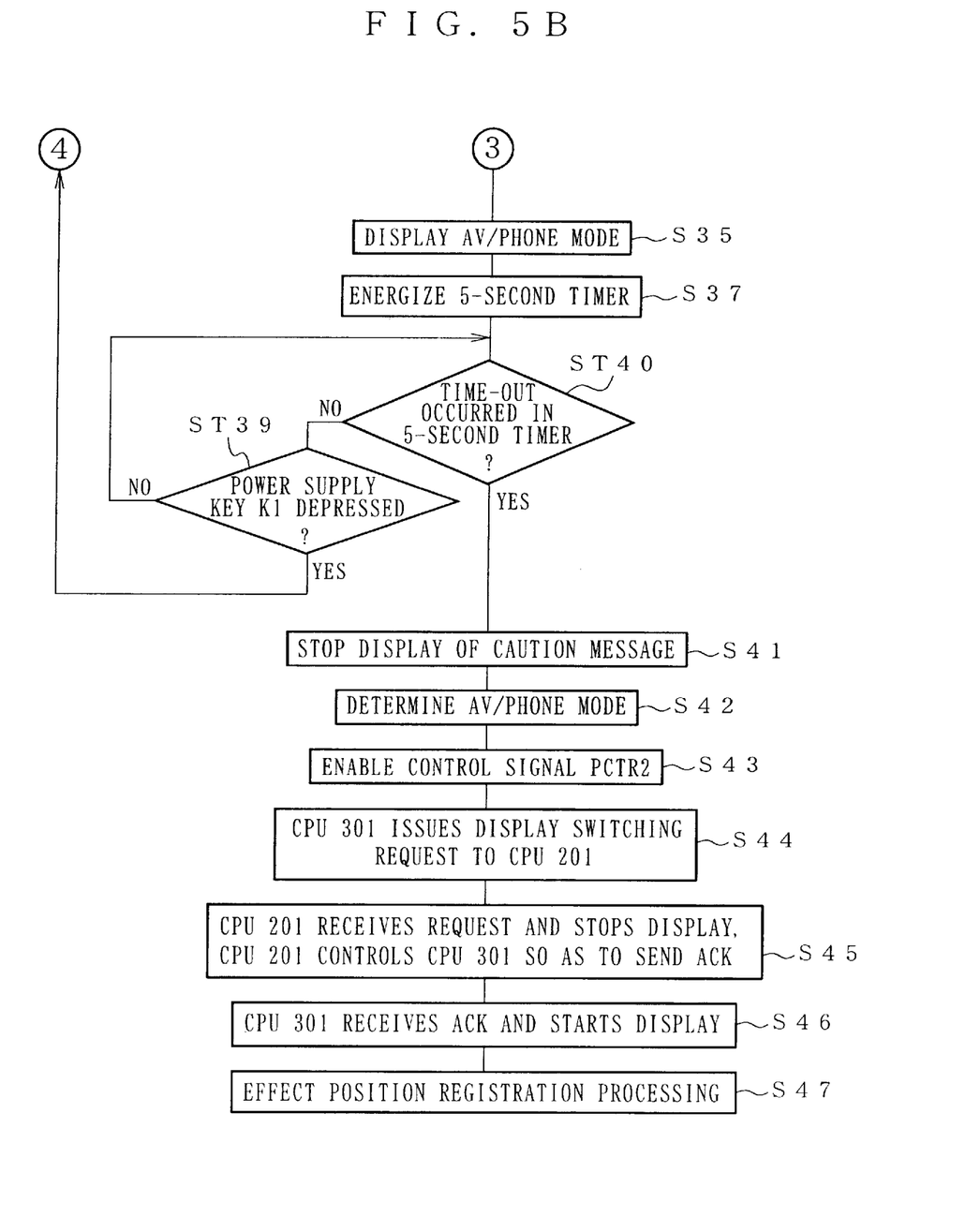

While the mode selected by the depression of the power supply key K1 may be determined by the depression of the power supply decision key K2 in the power supply control of the PM controller 101 shown in FIGS. 2A and 2B as described above, the present invention is not limited thereto, and the selected mode may be automatically determined after a predetermined time elapsed since each mode has been selected. FIG. 5 (formed of FIGS. 5A and 5B drawn on two sheets of drawings so as to permit the use of a suitable large scale) is a flowchart to which reference will be made in explaining the manner in which the PM controller 101 may control the power supply in the above-mentioned case. In the flowcharts shown in FIGS. 5A and 5B, steps corresponding to those of the flowcharts shown in FIGS. 2A and 2B are marked with the same reference numerals.

In the operations shown in FIGS. 5A and 5B, after the 5-second timer was started at the step S14, control goes to the next decision step S17, whereat it is determined whether or not the time-out occurred in the 5-second timer. If the time-out did not occur in the 5-second timer as represented by a NO at the decision step S17, then control goes to the step S16. At the decision step S16, it is determined whether or not the power supply key K1 is depressed. Then, if the power supply key K1 is not depressed as represented by a NO at the decision step S16 and if the time-out occurred in the 5-second timer as represented by a YES at the decision step S17, then control goes to the step S18, whereat the AV mode may be determined. If the power supply key K1 is depressed as represented by a YES at the decision step S16, then control goes to the step S20, whereat the message indicating the PHONE mode may be displayed on the display 404 of the common processing block 400.

Also, after the 5-second timer was started at the step S22, control goes to the step S25, whereat it is determined whether or not the time-out occurred in the 5-second timer. If the time-out did not occur in the 5-second timer as represented by a NO at the decision step S25, then control goes to the step S24. In the step S24, it is determined whether or not the power supply key K1 is depressed. If the power supply key K1 is not depressed as represented by a NO at the decision step S24 and if the time-out occurred in the 5-second timer as represented by a YES at the decision step S25, then control goes to the step S26, whereat the display of the caution message may be stopped. Also, if the power supply key K1 is depressed as represented by a YES at the decision step S24, then control goes to the step S35 (FIG. 5B), whereat the message indicating the AV/PHONE mode may be displayed on the display 404 of the common processing block 400.

As shown in FIG. 5B, after the 5-second timer was energized at the step S37, then control goes to the next decision step S40, whereat it is determined whether or not the time-out occurred in the 5-second timer. If the time-out did not occur in the 5-second timer, then control goes to the decision step S39. It is determined at the decision step S39 whether or not the power supply key K1 is depressed. If the power supply key K1 is not depressed as represented by a NO at the decision step S39 and if the time-out occurred in the 5-second timer as represented by a YES at the decision step S40, then control goes to the step S41, whereat the display of the caution message may be stopped. If on the other hand the power supply key K1 is depressed as represented by a YES at the decision step S39, control goes back to the step S19 (FIG. 5A), whereat the control signal PCTR1 may be disabled, and control then goes back to the power supply standby state.

In the flowcharts shown in FIGS. 5A and 5B, other steps are similar to those of FIGS. 2A and 2B. In the power supply control shown in FIGS. 5A and 5B, the mode selected by the depression of the power supply key K1 may automatically be decided after a predetermined time elapsed. Therefore, the power supply decision key K2 need not be used, and the user need not depress the power supply decision key K2.

Figure 6A:
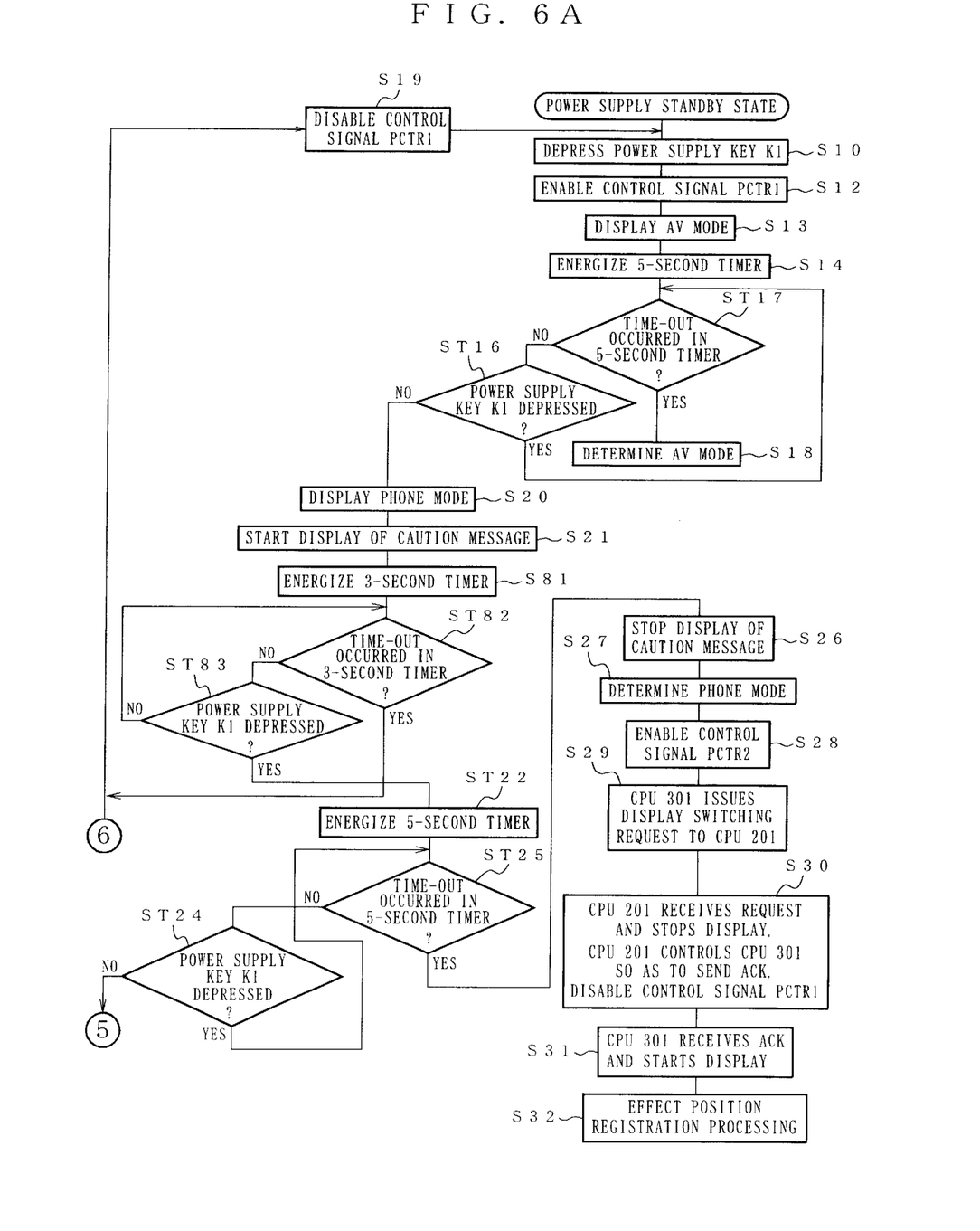
Figure 6B:
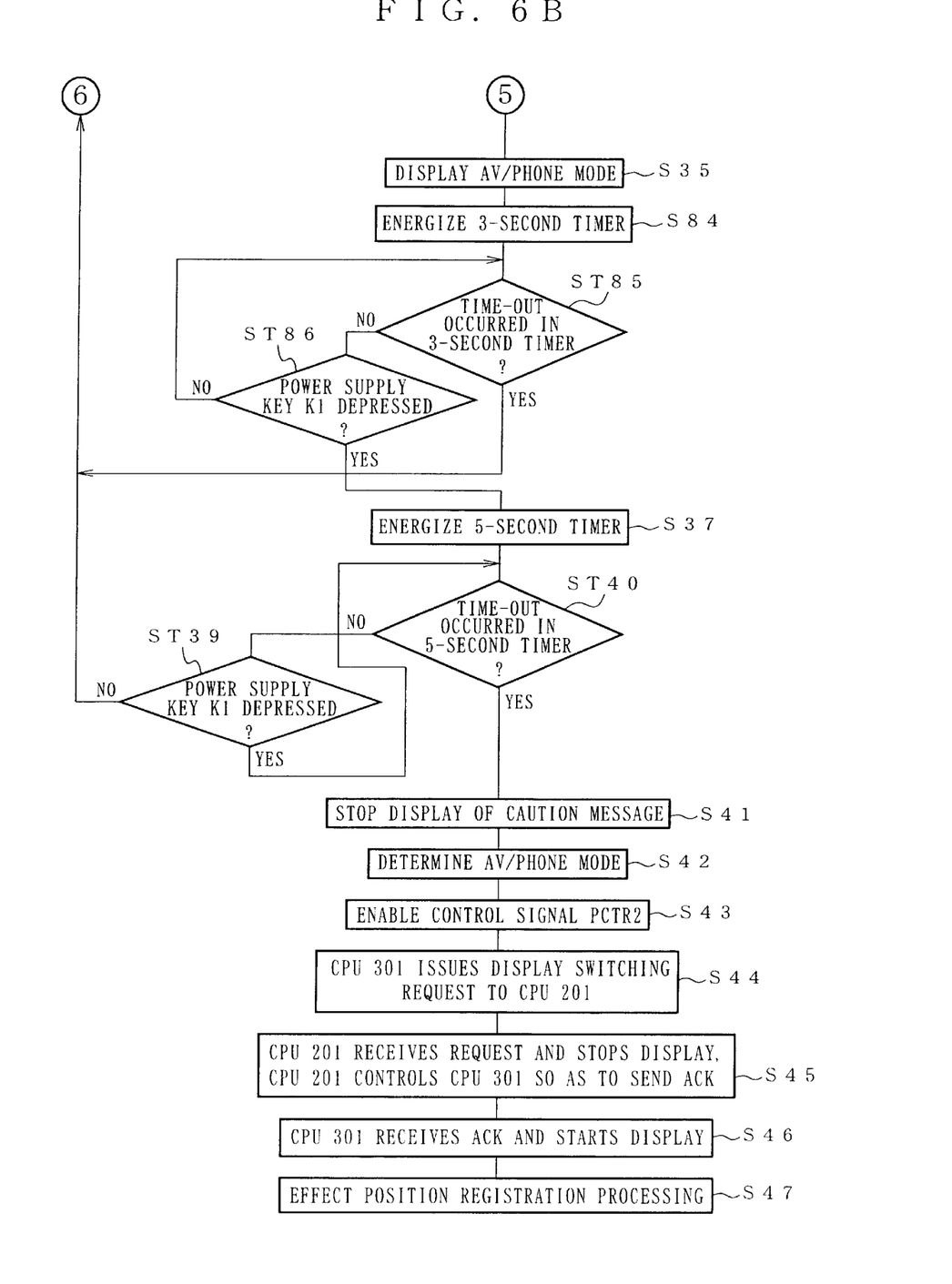

While the mode selected by the depression of the power supply key K1 may be decided by the depression of the power supply decision key K2 in the power supply control of the PM controller 101 shown in FIGS. 2A and 2B as described above, the present invention is not limited thereto, and the selected mode may be automatically determined after the selection operation, i.e. the depression of the power supply key K1 is continued during a predetermined time or longer. FIG. 6 (formed of FIGS. 6A and 6B drawn on two sheets of drawings so as to permit the use of a suitable large scale) is a flowchart to which reference will be made in explaining the manner in which the PM controller 101 may control the power supply in the above-mentioned case. In the flowcharts shown in FIGS. 6A and 6B, steps identical to those of the flowcharts shown in FIGS. 2A and 2B are marked with the same reference numerals.

In the operations shown in FIGS. 6A and 6B, referring to FIG. 6A, and following the power supply standby state, the power supply K1 is depressed at the step S10. Then, control goes to the step S12, whereat the control signal PCTR1 is enabled. Then, at the step S14, the 5-second timer is energized, and control goes to the next decision step S17. At the decision step S17, it is determined whether or not the time-out occurred in the 5-second timer. If the time-out did not occur in the 5-second timer as represented by a NO at the decision step S17, then control goes to the next decision step S16. It is determined at the decision step S16 whether or not the power supply key K1 is depressed. If the depression of the power supply key K1 is continued as represented by a YES at the decision step S16 and if the time-out occurred in the 5-second timer as represented by a YES at the decision step S17, then control goes to the step S18, whereat the AV mode may be decided. If the depression of the power supply key K1 is released before the time-out occurred in the 5-second timer, then control goes to the step S20, whereat a message indicating the PHONE mode is displayed on the display 404 of the common processing block 400.

Thereafter, the display of the caution message is started on the display 404 of the common processing block 400 at the step S21. Then, control goes to a step S81, whereat a 3-second timer is energized. Control goes to the next decision step S82, whereat it is determined whether or not a time-out occurred in the 3-second timer. Then, if the time-out did not occur in the 3-second timer as represented by a NO at the decision step S82, then control goes to the next decision step S83. It is determined at the decision step S83 whether or not the power supply key K1 is depressed. Then, if the power supply key K1 is not depressed as represented by a NO at the decision step S83 and if the time-out occurred in the 3-second timer as represented by a YES at the decision step S82, then control goes back to the step S19, whereat the control signal PCTR1 may be disabled, and control goes back to the power supply standby state.

If on the other hand the power supply key K1 is depressed as represented by a YES at the decision step S83 before the time-out occurred in the 3-second timer, then control goes to the step S22, whereat the 5-second timer is energized. Then, control goes to the next decision step S25, whereat it is determined whether or not the time-out occurred in the 5-second timer. If the time-out did not occur in the 5-second timer as represented by a NO at the decision step S25, then control goes to the next decision step S24. It is determined at the decision step S24 whether or not the power supply key K1 is depressed. If the depression of the power supply key K1 is continued as represented by a YES at the decision step S24 and if the time-out occurred in the 5-second timer as represented by a YES at the decision step S25, then control goes to the step S26, whereat the display of the caution message may be stopped. If the depression of the power supply key K1 is released before the time-out occurred in the 5-second timer, then control goes to the step S35 (FIG. 6B), whereat the message indicating the AV/PHONE mode may be displayed on the display 404 of the common processing block 400.

Then, referring to FIG. 6B, a 3-second timer is started at a step S84, and control goes to the next decision step S85, whereat it is determined whether or not the time-out occurred in the 3-second timer. If the time-out did not occur in the 3-second timer as represented by a NO at the decision step S85, then control goes to the next decision step S86. It is determined at the decision step S86 whether or not the power supply key K1 is depressed. If the power supply key K1 is not depressed as represented by a NO at the decision step S86 and if the time-out occurred in the 3-second timer as represented by a YES at the decision step S85, then control goes back to the step S19 (FIG. 6A), whereat the control signal PCTR1 may be disabled, and control goes back to the power supply standby state.

If on the other hand the power supply key K1 is depressed as represented by a YES at the decision step S86 before the time-out occurred in the 3-second timer, then control goes to the step S37, whereat the 5-second timer is energized. Then, control goes to the next decision step S40, whereat it is determined whether or not the time-out occurred in the 5-second timer. If the time-out did not occur in the 5-second timer as represented by a NO at the decision step S40, then control goes to the next decision step S39. At the decision step S39, it is determined whether or not the power supply key K1 is depressed. If the depression of the power supply key K1 is continued as represented by a YES at the decision step S39 and if the time-out occurred in the 5-second timer as represented by a YES at the decision step S40, then control goes to the step S41, whereat the display of the caution message may be stopped. If the depression of the power supply key K1 is released before the time-out occurred in the 5-second timer, then control goes back to the step S19, whereat the control signal PCTR1 may be disabled, and control goes back to the power supply standby state.

In the flowcharts shown in FIGS. 6A and 6B, other steps are similar to those of the flowcharts shown in FIGS. 2A and 2B. Since each mode selected by the depression of the power supply key K1 may automatically be determined by continuing the depression of the power supply key K2 longer than a predetermined time period in the power supply control shown in FIGS. 6A and 6B, the power supply decision key K2 need not be used, and the user need not depress the power supply decision key K2.

While the supply of the power to the AV processing block 200 and the telephone processing block 300 may be controlled in order to control the operation and the non-operation of the AV processing block 200 and the telephone processing block 300 as described above, the present invention is not limited thereto. Alternatively, the power supply control line, i.e. chip-enable may be controlled in order to control the AV processing block 200 and the telephone processing block 300.

While the keys are employed as the input devices as described above, the present invention is not limited thereto, and input devices using speech recognition may be used. While the user can repeatedly select the respective modes by sequentially depressing the power supply key K1 as described above, the present invention can be similarly applied to an electronic device in which input devices for energizing the power supply may be provided on each mode.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic device comprising:
   a first function section for generating electromagnetic waves of a level higher than a predetermined level;
   a second function section which does not generate said electromagnetic waves;
   selection operation means including first and second switches controlled by a user for selecting, using said first switch, among a first operation mode wherein only said first function section operates, a second operation mode wherein only said second function section operates, and a third operation mode wherein said first and second function sections operate, and for enabling the selected operation mode using said second switch; and
   control means for controlling a power supply for selectively controlling the powering on and off of said first and second function sections in response to a selection made by said selection operation means; and for reporting a caution message for a predetermined period of time after said user selects one of said first and said third operation modes using said first switch and before said user enables the selected operation mode using said second switch.

2. The electronic device as claimed in claim 1, wherein said first function section is a wireless telephone and said second function section is an audio/visual apparatus.

3. The electronic device according to claim 1, further comprising:

state recovery means for returning said first and second function sections to a standby state when said confirmation operation means does not confirm the selected operation mode selected using said first switch is not enabled using said second switch before the expiration of said predetermined period of time.

4. The electronic device as claimed in claim 1, wherein said control means reports said caution message in the form of one of a character and an image on a display device.

5. The electronic device as claimed in claim 1, wherein said control means reports said caution message using an audio output device.

6. The electronic device as claimed in claim 1, wherein said control means reports said caution message using a vibrator.

* * * * *